H. A. WOLVERTON, W. E. PIXLEY & C. W. DERRICKSON.
HORSE COLLAR FASTENER.
APPLICATION FILED MAY 4, 1909.
930,448.
Patented Aug. 10, 1909.
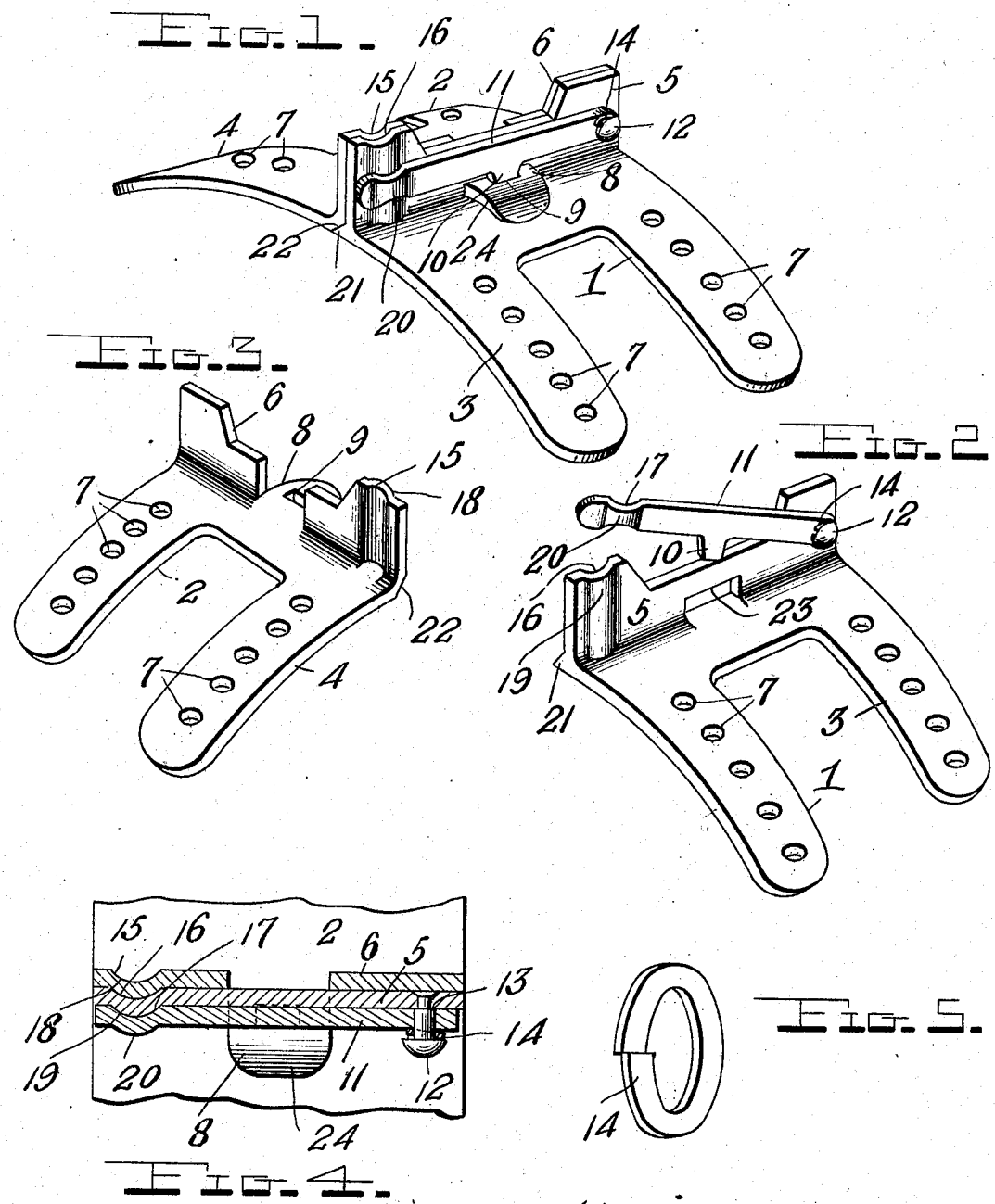

UNITED STATES PATENT OFFICE.

HALIETT A. WOLVERTON, WALTER E. PIXLEY, AND CAREY W. DERRICKSON, OF ALBANY, INDIANA.

HORSE-COLLAR FASTENER.

No. 930,448.　　　Specification of Letters Patent.　　　Patented Aug. 10, 1909.

Application filed May 4, 1909. Serial No. 493,884.

*To all whom it may concern:*

Be it known that we, HALIETT A. WOLVERTON, WALTER E. PIXLEY, and CAREY W. DERRICKSON, citizens of the United States, residing at Albany, in the county of Delaware and State of Indiana, have invented certain new and useful Improvements in Horse-Collar Fasteners, of which the following is a specification, reference being had to the accompanying drawings.

This invention relates to means for securing together on the neck of a horse or other draft animal, the free ends of that class of horse collars which are known as open collars.

The object of this invention is to simplify and improve the construction of fasteners of this class whereby the parts of the fastener may be more easily and cheaply constructed and the two main portions quickly secured together and held against any tendency to become loosened from each other.

With this object in view the invention consists in the improved construction, arrangement and combination of the parts of a fastener of this class, which will be fully hereinafter described and afterward specifically claimed.

In the drawing, which illustrates a preferred form of fastener constructed in accordance with our invention, Figure 1 is a perspective view with the parts connected together and locked. Fig. 2 is a perspective view of what we shall denominate the latch member, detached. Fig. 3 is a similar view of the catch member, detached. Fig. 4 is a horizontal sectional view through the two meeting flanges and the latch, and Fig. 5 is a perspective view of the elastic split washer.

The parts of this improved fastener may be manufactured by casting, and perhaps preferably, by stamping the parts out of heavy sheet or plate metal, and we desire it to be understood that the scope of our invention includes fasteners made by any of the known methods of working metal.

Referring specifically to the drawings, 1 indicates the latch section and 2, the catch section of our improved fastener each of which comprises a base plate, as at 3 and 4, and a substantially right angled upright flange as at 5 and 6, each base plate being provided with holes 7 by means of which they may be secured to the ends of a collar. The metal which would ordinarily form the central portion of the flange 6, is in this instance separated from the flange and bent downward into position to form a tongue 8 to rest upon the upper surface of the latch section 1 when projected over said section. This tongue is provided with a vertical opening 9 to receive a projection or detent 10 on a latch 11 pivotally secured to the flange 5 of the latch member 1, by means of a rivet 12, preferably of the form shown in Fig. 4, the diameter of that part of the rivet which is contained in the flange 5 being reduced in order to form a shoulder 13 to bear against the surface of the flange 5 in order to prevent the too close squeezing or grasping of a spring member 14 between the latch 11 and the head of the rivet. This spring member in the present instance is shown as a split elastic washer which will bear yieldingly against the outer surface of the latch 11, but a rubber washer or coil spring might be substituted therefor.

In the manufacture of the parts, the flange 6 of the catch member 2, the flange 5 of the latch member 1 and the latch 11 are formed with depressions 15, 16 and 17 on one side and corresponding projections 18, 19 and 20 on the opposite side, and when these parts are in locked position the projections and depressions register with each other, the projection 18 of the flange 6 fitting in the depression 16 of the flange 5 and serving to cause these parts to register properly and prevent the sliding of one flange upon the other, while the depression 17 of the latch 11, when the latch is brought down into locked position, as shown in Fig. 1, will slip over the projection 19 of the flange 5, and will be held yieldingly in contact therewith and thus prevent it from becoming accidentally loosened therefrom, by means of the elasticity of the member 14 under the head of the rivet 12.

The two members 1 and 2, in order to more fully insure their proper registering with each other when brought together, may be formed with inclined overlapping edges as shown at 21 and 22, but the simple provision of the registering projections and depressions before described will be sufficient for all general purposes.

When the parts are brought together, the tongue 8 will slip through the opening 23 in the flange 5, and, as before stated, will ride upon the face of the base plate 3 of the latch member 1 and, by reason of its beveled front end 24, it will raise the latch 11 out of its path, should the catch at that time be in its closed position. By now pressing upon the latch, its depression will be made to slip over and yieldingly engage with the projection on the flange 5 where it will be yieldingly held by the spring member 14, which will not only serve to hold the latch yieldingly in its locked position, but by reason of the proper location of the engaging depression of the latch and projection of the flange 5, the latch will be held at a proper height to leave a narrow space between its detent and the surface of the base plate 3, whereby the beveled end 24 of the catch or tongue may be slipped under.

By using part of the flange 5 to form the tongue or catch 8, the catch member 2 is more readily and quickly and economically made of less metal and less weight than if the tongue were otherwise provided, the parts of the flange remaining being fully sufficient for all practical purposes.

The engaging projections and depressions can be readily made during the manufacture of the two members, either by casting or stamping, thus involving no greater expense than to make the members plain.

The latch may be just as cheaply made with its depression; the usefulness of which is obvious.

What we claim as new and desire to secure by Letters Patent, is:—

In a horse collar fastener, the combination of a latch member and a catch member, each provided with vertical meeting flanges, the flange of the catch member being turned downward to form a catch and the flange of the latch member being provided with an opening to receive said catch, a latch having a detent to engage the catch, said latch being pivoted to the flange of the latch member and provided with means for holding it yieldingly in contact therewith, the two flanges and the latch being provided with registering depressions and projections for holding the flanges in proper relative positions and holding the latch in its locked position.

In testimony whereof we hereto affix our signatures in the presence of two witnesses.

HALIETT A. WOLVERTON.
WALTER E. PIXLEY.
CAREY W. DERRICKSON.

Witnesses:
O. L. HUFFMAN,
JOHN S. KROHN.